United States Patent [19]
Otsuka

[11] Patent Number: 5,729,521
[45] Date of Patent: Mar. 17, 1998

[54] OPTICAL HEAD UNIT FOR GUIDING A LIGHT BEAM MORE RELIABLE TO A CENTER OF A TRACK OF AN OPTICAL DISK

[75] Inventor: Hideki Otsuka, Hiratsuka, Japan

[73] Assignee: Kabushiki Kaisha Toshiba, Kawasaki, Japan

[21] Appl. No.: 617,629

[22] Filed: Mar. 19, 1996

[30] Foreign Application Priority Data

Jul. 31, 1995 [JP] Japan ................................. 7-195115

[51] Int. Cl.⁶ ....................................................... G11B 7/00
[52] U.S. Cl. ........................... 369/112; 369/44.14; 369/119
[58] Field of Search ...................................... 369/119, 44.13, 369/44.28, 44.26, 44.34, 112, 44.14, 100

[56] References Cited

U.S. PATENT DOCUMENTS 4,782,474  11/1988  Arai et al. ............................ 369/119
4,866,688   9/1989  Ohtake et al. ........................ 369/100
5,136,559   8/1992  Nakayamma ........................ 369/119

Primary Examiner—David C. Nelms
Assistant Examiner—Kim-Kwok Chu
Attorney, Agent, or Firm—Cushman, Darby & Cushman IP Group of Pillsbury Madison & Sutro LLP

[57] ABSTRACT

In an optical head unit, a reflection mirror for reflecting a light beam emitted from a laser element to an optical disk is rotated about a predetermined point which is on one of an extended portion of a first optical axis extending between the laser element and the mirror and an extended portion of a second optical axis extending between the mirror and the optical disk. A center of gravity of a movable section of the mirror is located closer to the optical disk than a reflection point of a reflection surface of the mirror, which intersects the first optical axis and the second optical axis and at the same time is located more remote from the laser element than the reflection point. Alternatively, the center of gravity of the movable section is located closer to the laser element than the reflection point and more remote from the optical disk than the reflection point.

19 Claims, 7 Drawing Sheets

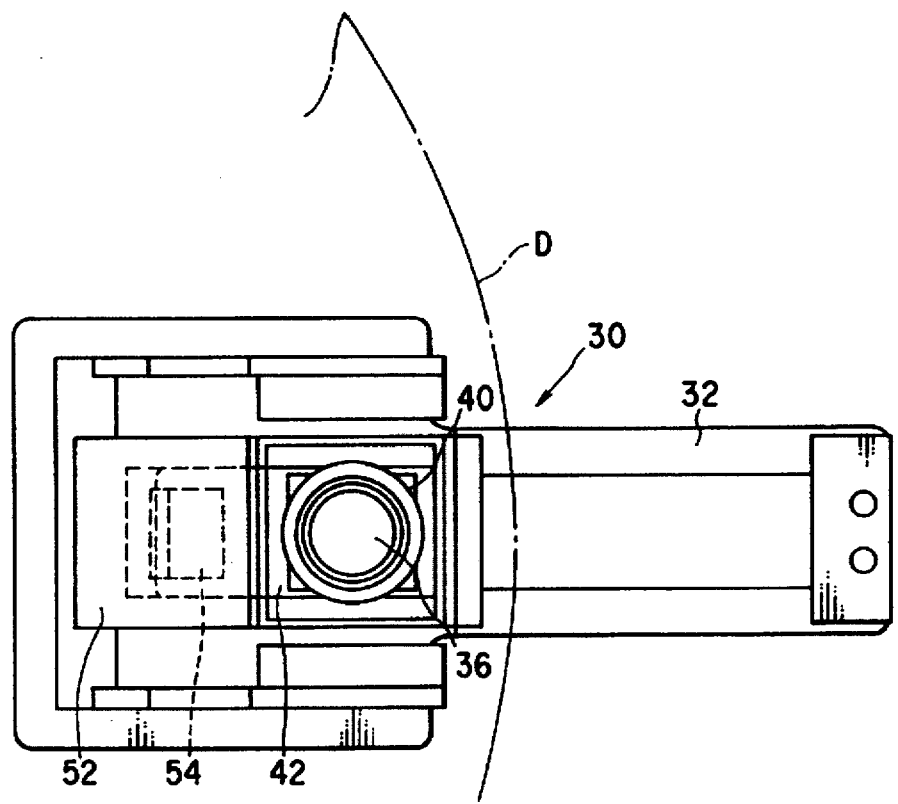
F I G. 2
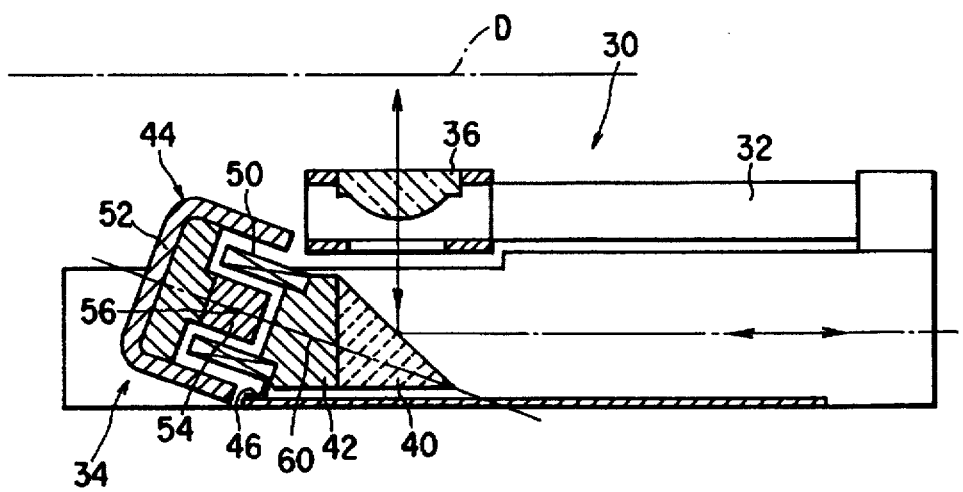
F I G. 3

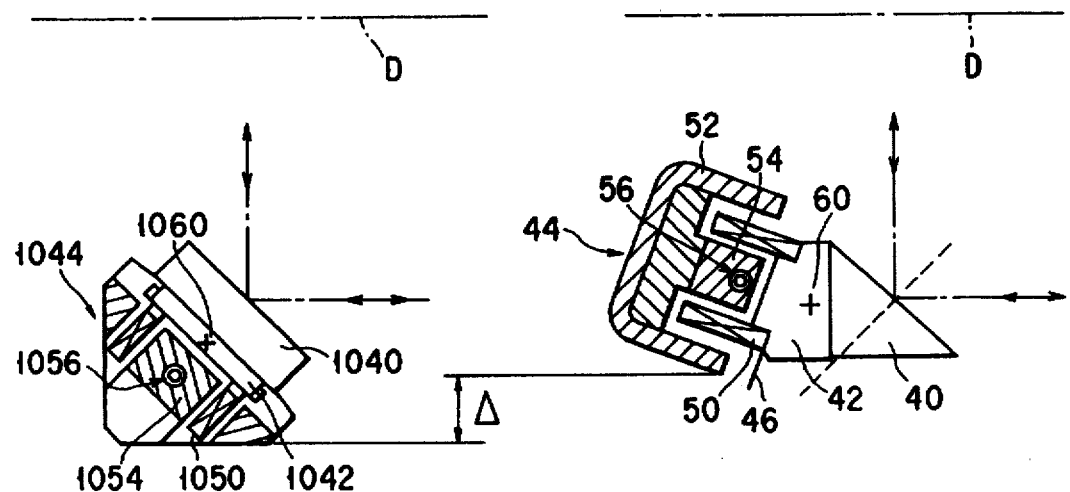
FIG. 4B (PRIOR ART)
FIG. 4A
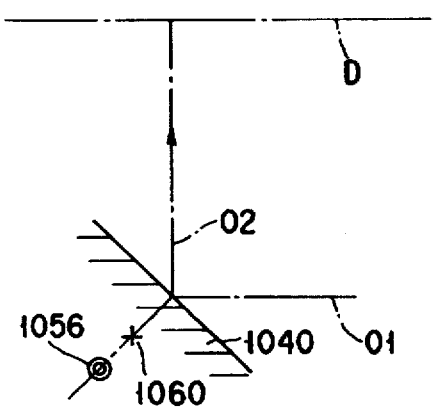
FIG. 5B (PRIOR ART)
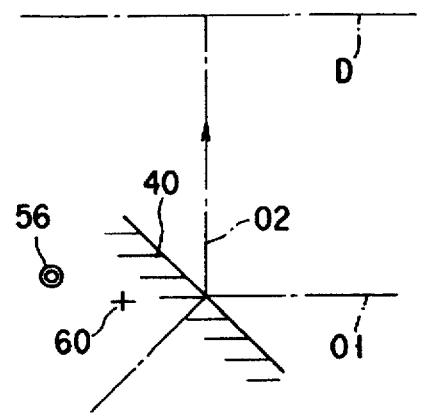
FIG. 5A

OPTICAL HEAD UNIT FOR GUIDING A LIGHT BEAM MORE RELIABLE TO A CENTER OF A TRACK OF AN OPTICAL DISK

BACKGROUND OF THE INVENTION

1. Field of the Invention

This invention relates to an optical head unit for recording data in an optical disk and reading data therefrom, and also to an optical disk drive for use with the optical head.

2. Description of the Related Art

An optical disk apparatus includes an optical head unit having a laser element for emitting a light beam, an objective lens for converging the light beam from the laser element, onto the recording surface of an optical disk (recording media) and receiving a light beam reflected therefrom, and photo detectors for outputting electric power signals corresponding to the intensity variations of the light beam reflected from the optical disk.

The optical disk apparatus constructed as above reads data stored in the optical disk and writes data into the same by applying a light beam to the recording surface of the optical disk.

The optical head unit employs a mirror for directing a light beam emitted from the laser element, to the recording surface of the optical disk, and aligning the center of each groove (i.e. track) formed in the recording surface of the optical disk, with the center of a light beam having passed the objective lens. This mirror is called a "galvano mirror" (which can be rotated by a motor or a rotary support mechanism to change the direction of reflection of light).

The galvano mirror sets, to a predetermined angle, the angle formed by the optical axis between the laser element and itself and the optical axis between itself and the objective lens. Further, the galvano mirror is rotated in a predetermined direction so that a light beam having passed the center of the objective lens can be converged to the center of each track.

To this end, the galvano mirror is formed of a rotary support mechanism and a mirror driving mechanism. The mirror driving mechanism is arranged such that the rotary shaft of the support mechanism is positioned on a line perpendicular to that point of the reflection surface of the mirror which intersects the optical axis extending between the laser element and the mirror itself, i.e. the reflection point of the mirror.

Host apparatuses such as a host computer, a word processor, etc. are now made compact, and each have only a small space for installing the optical disk apparatus therein. Accordingly, the optical head unit including the galvano mirror needs to be made thinner.

Further, it is difficult to produce an optical head unit of a small volume, since the rotary support mechanism and the mirror driving mechanism of the galvano mirror project in a direction away from the optical disk, with the optical axis between the laser element and the galvano mirror interposed therebetween.

Moreover, since the center of rotation of the mirror driving mechanism of the galvano mirror is positioned on a line perpendicular to the reflection point of the mirror, it is possible that the optical axis of the objective lens will be greatly deviated from the center of a light beam to be guided to the objective lens, even when the galvano mirror is slightly rotated.

In addition to the above, in the case of a ROM (Read Only Memory) scheme optical disk, a method has been proposed for increasing the sampling rate by increasing the rotational speed of the optical disk to 2–6 times higher than ever. In this case, a motor of high torque is necessary to rotate the optical disk, and therefore the size of the motor is inevitably large. This being so, a space close to the center of rotation of the optical disk is narrowed, which further reduces the size of the mirror driving mechanism.

SUMMARY OF THE INVENTION

It is an object of the invention to provide an optical head unit capable of guiding a light beam having passed an objective lens, to the center of each track of an optical disk.

It is another object of the invention to provide an optical head unit in which the amount of deviation of the optical axis of the objective lens from the center of a light beam directed to the objective lens is small.

It is a further object of the invention to provide an optical head unit of a small volume.

It is a yet another object of the invention to provide a thin optical head unit.

It is an object of the invention to provide an optical head unit which does not project much toward the center of rotation of the optical disk.

According to a first aspect of the invention, there is provided an optical head unit for use in a data read/write apparatus comprising: means for reflecting light emitted from a light source, to a recording medium; means for supporting the reflecting means such that the reflecting means can rotate about a predetermined point located on an extension from an optical axis extending between the reflecting means and the light source; and means for rotating the supporting means about the predetermined point.

According to a second aspect of the invention, there is provided an optical head unit for use in a data read/write apparatus comprising: means for reflecting light emitted from a light source, to a recording medium; means for supporting the reflecting means such that the reflecting means can rotate about a predetermined point located on an extension from an optical axis perpendicular to the recording surface of the recording medium; and means for rotating the supporting means about the predetermined point.

According to a third aspect of the invention, there is provided an optical head unit for use in a data read/write apparatus comprising: a light source for generating a light beam; means for reflecting the light beam emitted from the light source, to a recording medium; means for supporting the reflecting means such that the reflecting means can rotate about a predetermined point which is not located on a normal line perpendicular to the reflection surface of the reflecting means; and means for rotating the supporting means about the predetermined point.

According to a fourth aspect of the invention, there is provided a data read/write apparatus comprising: a laser element for emitting a light beam; means for reflecting the light beam emitted from the laser element, to a recording medium; means for supporting the reflecting means such that the reflecting means can rotate about a predetermined point which is not located on a normal line perpendicular to the reflection surface of the reflecting means; means for rotating the supporting means about the predetermined point; means for separating, by diffraction, a light beam reflected from the recording medium, from the light beam directed from the laser element to the recording medium; means for converting the light beam reflected from the recording medium and separated by the separating means, to an electric signal corresponding to the intensity of the light beam; means for controlling the amount of rotating of the rotating means on the basis of an output from the converting means; and means for reproducing data stored in the recording medium on the basis of an output from the converting means.

According to a fifth aspect of the invention, there is provided an optical head unit for use in a data read/write apparatus comprising: a laser element for emitting a light beam; means for reflecting the light beam emitted from the laser element, to a recording medium; means for supporting the reflecting means such that the reflecting means can rotate about a predetermined point which is not located on a normal line perpendicular to the reflection surface of the reflecting means which intersects a first optical axis extending between the laser element and the reflecting means and a second optical axis extending between the reflecting means and the recording medium.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 2 is a plan view of the optical head unit shown in FIG. 1;

FIG. 3 is a lateral sectional view of the optical head shown in FIG. 1;

FIG. 4A is a schematic sectional view, showing a mirror driving unit incorporated in the optical head unit shown in FIGS. 1–3;

FIG. 4B is a schematic longitudinal sectional view, showing a conventional mirror driving unit to be compared with the mirror driving unit of FIG. 4A;

FIG. 5A is a schematic view, showing the center of rotation and the center of driving of the mirror driving unit of FIG. 4A;

FIG. 5B is a schematic view, showing the center of rotation and the center of driving of the conventional mirror driving unit of FIG. 4B;

DETAILED DESCRIPTION OF THE PREFERRED EMBODIMENTS

The embodiment of the invention will be explained with reference to the accompanying drawings.

Figure 1:
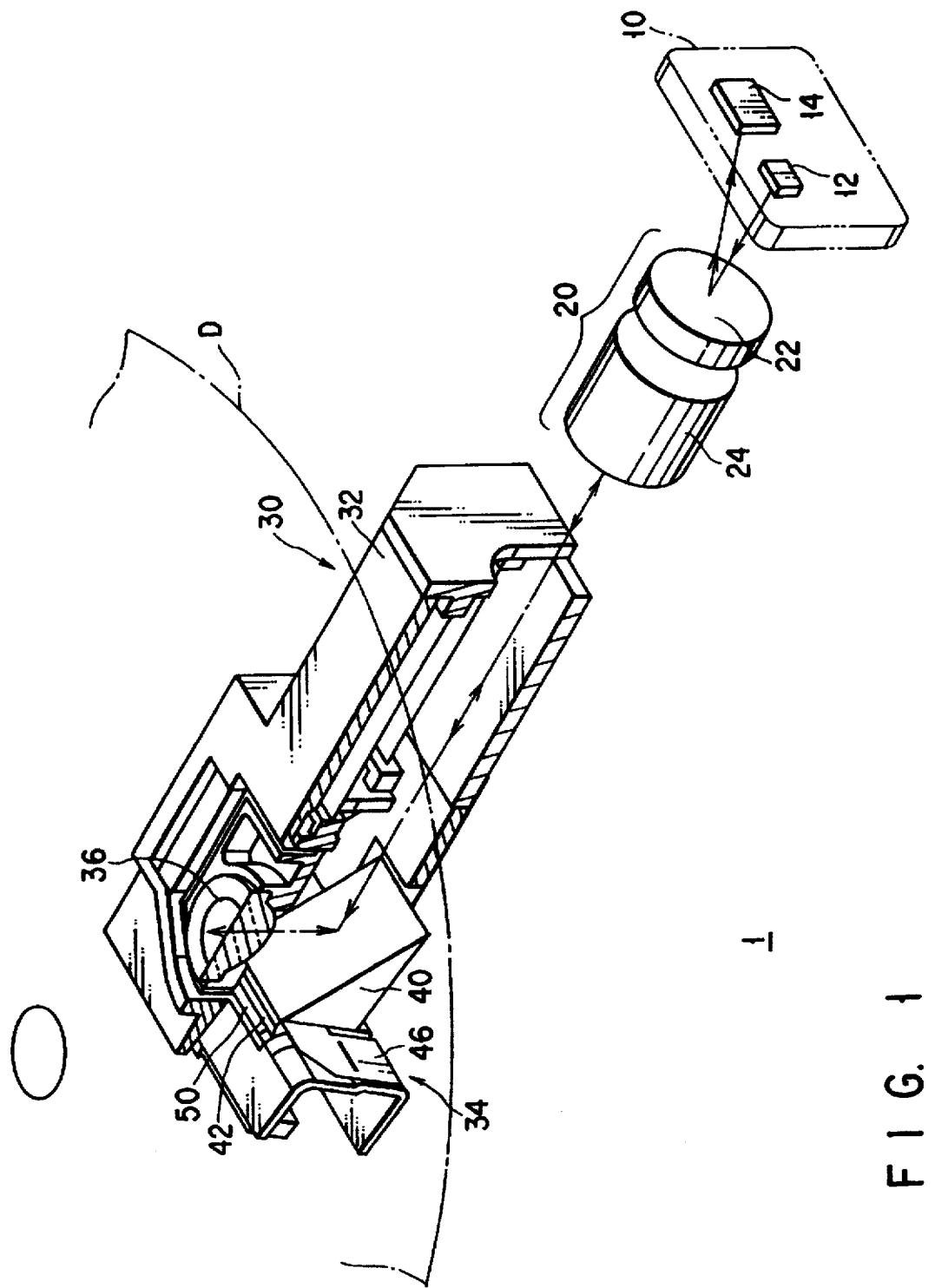
FIG. 1 is a schematic view, showing an optical head unit according to the embodiment of the invention.

As is shown in FIG. 1, an optical head unit 1 has a light emitting/receiving unit 10, a stationary optical system 20, and a movable optical system 30.

The light emitting/receiving unit 10 includes a semiconductor laser element (hereinafter referred to as "laser element") 12 serving as a light source, and a photo detector 14 with a plurality of detection areas arranged in a predetermined manner. These components 12 and 14 are formed integral with each other. The light emitting/receiving unit 10 generates a laser beam of a predetermined wavelength, and converts, to an electric signal, a laser beam reflected from the recording surface (not shown) of an optical disk D as a recording medium.

The stationary optical system 20 has a diffraction grating 22, a collimator lens 24, a ¼ plate for isolating the laser beam directed from the laser element 12 to the optical disk D and reflected laser beam reflected from the optical disk D. The system 20 imparts predetermined optical characteristics to the laser beam emitted from the light emitting/receiving unit 10, and also to the reflected laser beam.

The diffraction grating 22 has a predetermined diffraction pattern formed with the use of a hologram. The grating 22 passes therethrough the laser beam directed from the unit 10 to the optical disk, and guides the reflected laser beam reflected from the optical disk in a direction different from the direction of the laser beam emitted from the unit 10.

The movable optical system 30 is interposed between the stationary optical system 20 and the optical disk D. The system 30 converges the laser beam from the light emitting/receiving unit 10, onto a predetermined portion of the recording surface (not shown) of the optical disk D, and guides the laser beam reflected from the optical disk D, to the unit 10.

The movable optical system 30 has a housing 32 which is movable in a radial direction of the optical disk D via a driving coil (not shown).

A galvano mirror unit 34 is housed in a predetermined portion (an upper left portion in the FIG. 1 case) of the housing 34. The mirror unit 32 diverts (i.e. reflects) the laser beam from the light emitting/receiving unit 10 to the recording surface of the optical disk D, and diverts (i.e. reflects) the laser beam reflected from the optical disk D, to the stationary optical system 20 (i.e. to the unit 10).

An objective lens 36 is interposed between the galvano mirror unit 34 and the optical disk D. The lens 36 converges the laser beam diverted by the galvano mirror unit 34, onto the recording surface of the optical disk D, and receives the laser beam reflected therefrom.

The galvano mirror unit 34 will be explained in detail.

As is shown in FIGS. 2 and 3, the galvano mirror unit 34 includes a flat-surface mirror 40, a mirror support member 42, a mirror driving unit 44 and a plate spring 46. The flat-surface mirror 40 diverts (reflects) the laser beam from the light emitting/receiving unit 10, to the recording surface of the optical disk D, and diverts the laser beam reflected from the recording surface, to the stationary optical system 20. The flat-surface mirror 40 is a face mirror or a prism mirror, which has a triangular cross section or a quadrilateral cross section, with non-parallel sides as viewed in a direction perpendicular to a plane defined by the optical axis 01 between the mirror itself and the light emitting/receiving unit 10, and the normal line of the reflection surface of the flat-surface mirror 40. At least one of the two sides (surfaces) of the flat-surface mirror 40 which are perpendicular to each other is fixed to a predetermined portion of the mirror support member 42 by means of an adhesive or a fixing mechanism. The mirror support member 42 supports the flat-surface mirror 40 such that the mirror can move in a predetermined direction. The mirror support member 42 is formed integral with a driving coil (which will be explained later) for the mirror driving unit 44 to support the same (i.e. the member 42 is used as the bobbin of the driving coil). The mirror driving unit 44 applies a driving force to the mirror support member 42 for moving, by a predetermined amount, the member 42 and hence the flat-surface mirror 40. The plate spring 46 supports the mirror support member 42 such that the member 42 can rotate. The plate spring 46 sets, to a voluntary value, the angle formed between the mirror 40 and the optical axis 01 by rotating the mirror support member 42 about the center of rotation thereof (which corresponds to the center of gravity of a movable section explained later referring to FIG. 4A). Further, the plate spring 46 balances the mirror support member 42 against the driving force applied thereto by the mirror driving unit 44. The thickness, i.e. the spring constant, of the plate spring 46 and the torsional rigidity of the same are optimized so as to set, to the voluntary value, the angle between the mirror 40 and the optical axis 01.

As is shown in FIG. 3, the mirror driving unit 44 has a mirror driving coil 50 formed integral with that bobbin portion of the mirror support member 42 which is located remote from the flat-surface mirror 40. A yoke 52, which is used as a case containing the mirror driving unit 44 and also as a part of a magnetic circuit for the coil 50, surrounds the driving coil 50. In a region defined by the yoke 52 and the coil 50, a stationary magnet 54 is located which provides the coil 50 with a magnetic field of a predetermined direction and cooperates with the yoke 52 to constitute the magnetic circuit. The center 56 of gravity of the mirror driving unit 44 itself is situated in the stationary magnet 54.

Detailed explanations will be given of the physical characteristics of the galvano mirror unit 34, and of the direction in which the laser beam is reflected by the unit 34.

As is shown in FIGS. 4A and 5A, the center 60 of gravity of a movable section, consisting of the flat-surface mirror 40, the mirror support member 42 and the mirror driving coil 50 which are assembled integral with each other, is situated on an extended line of the optical axis 01 extended from that point of the reflection surface of the mirror 40 which intersects the optical axis 01. Further, the center 60 of gravity of the movable section is made identical to the center of gravity of the mirror support member 42 by optimizing the size, the configuration and/or the material of the mirror support member 42 and the size and/or the weight of the coil 50. As is shown in FIG. 5A, the center 60 of gravity of the movable section is made identical to the center of rotation of the mirror 40, too. Moreover, the center 60 of gravity is distorted relative to a line perpendicular to that point of the reflection surface of the mirror 40 which intersects the optical axis 01. On the other hand, the driving center of the mirror driving unit 44, i.e. the center 56 of gravity of the stationary magnet 54, is situated in that position between the optical axis 01 and the optical disk D wherein only the magnetic moment exerts a force (i.e. no distortion will occur).

FIGS. 4B and 5B show a conventional mirror unit as a comparative example. This unit comprises a flat-surface mirror 1040, a bobbin 1042, a mirror driving unit 1044, a mirror driving coil 1050, and a stationary magnet 1054. The mirror 1040 is shaped symmetrically with respect to an extended line of the optical axis 01 extended from that point of the reflecting surface of the mirror 1040 which intersects the optical axis 01. Further, the center 1060 of gravity of a movable section consisting of the flat-surface mirror 1040, the bobbin 1042 and the mirror driving coil 1050, and the driving center 1056 of the mirror driving unit 1044 are situated on the extended line of the optical axis 01 extended from the intersection point of the reflection surface of the mirror 1040.

As is evident from FIGS. 4A and 4B, the lowest portion of the mirror unit of the invention is closer to the optical disk D by $\Delta$ than the lowest portion of the conventional mirror unit.

The characteristics of the laser beam reflected from the galvano mirror unit 34 will now be explained in detail.

Figure 6A:
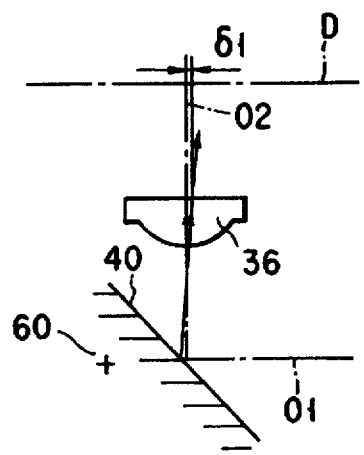
FIG. 6A is a schematic view, showing the amount of rotation of the mirror driving unit of FIG. 4A, and the feature of light reflected by a mirror.

As is shown in FIG. 6A, the laser beam from the laser element 12 enters the flat-surface mirror 40 in a state in which its main light beam substantially passes the optical axis 01 between the laser element 12 and the mirror 40. In other words, as was explained with reference to FIGS. 1–3, the laser beam reflected from the mirror 40 and guided to the recording surface of the optical disk passes the objective lens 36 in a state in which its main light beam substantially passes the optical axis 02 between the mirror 40 and the objective lens 36.

To perform tracking (which is a known technique and hence is not explained), the mirror 40 is rotated about the center 60 of rotation (i.e. the center of gravity) thereof, with the result that the laser beam reflected from the mirror 40 is guided to the recording surface of the optical disk at a predetermined angle relative to the optical axis 02. At this time, the laser beam having passed the objective lens 36 is converged to a point of the optical disk deviated by $\delta 1$ from the target point of the same which intersects the optical axis 02.

Figure 6B:
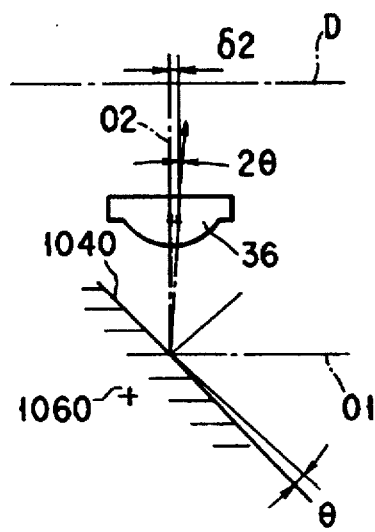
FIG. 6B is a schematic view, showing the amount of rotation of the conventional mirror driving unit of FIG. 4B, and the feature of light reflected by a mirror.

On the other hand, in the comparative conventional case shown in FIG. 4B, the laser beam reflected from the mirror 1040 is converged to a point of the optical disk deviated by $\delta 2$ (see FIG. 6B) from the target point of the same which intersects the optical axis 02, as a result of the mirror 1040 rotating about the center 1060 of rotation thereof. If in the case of the conventional mirror driving unit 1044, the mirror 1040 is inclined by $\theta$ relative to the position of the mirror when the laser beam reflected therefrom converges on the target point with no deviation, the angle formed between the optical axis 02 and the laser beam reflected from the mirror 1040 to the optical disk is $2\theta$, as is shown in FIG. 6B.

Figure 7:
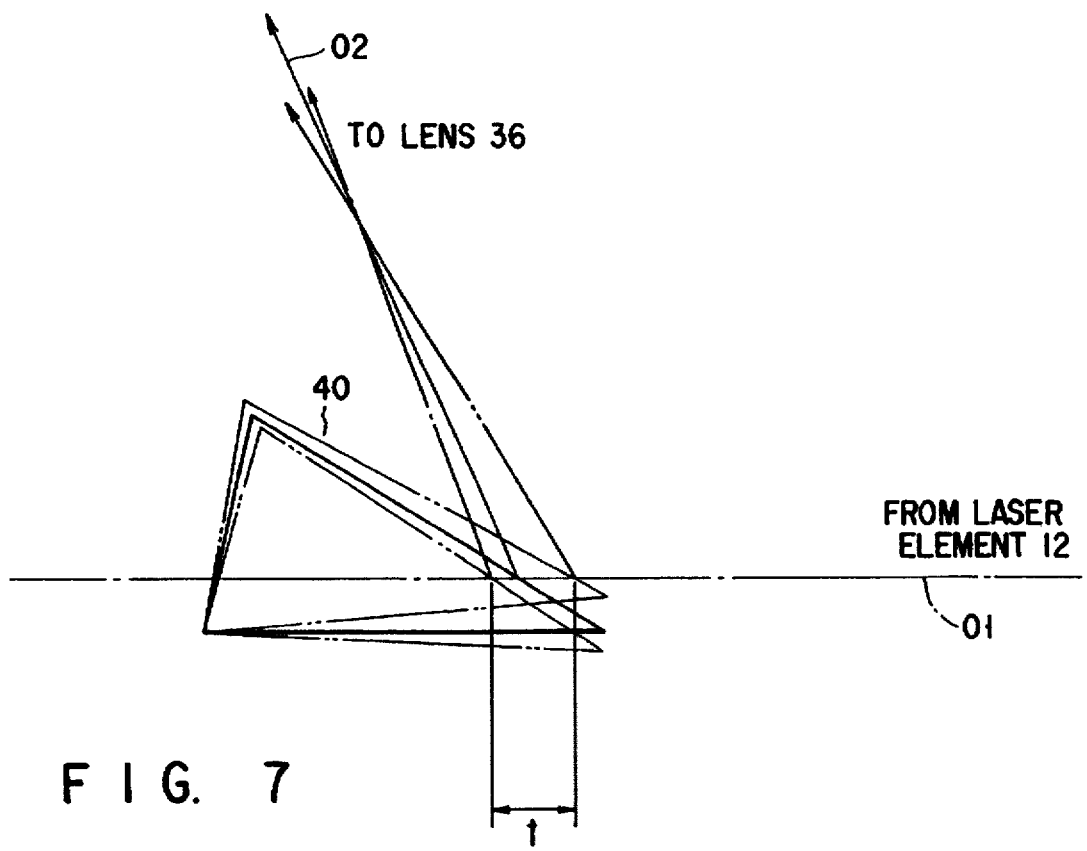
FIG. 7 is a schematic view, showing the relationship between the reflection point and the center of rotation of the mirror shown in FIG. 4A.

On the other hand, if in the case of the mirror driving unit 44 of the invention shown in FIG. 5A, the mirror 40 is inclined by $\theta'$ relative to the position of the mirror when the laser beam reflected therefrom converges on the target point with no deviation, the angle formed between the optical axis 02 and the laser beam reflected from the mirror 40 to the optical disk is 2θ'. However, θ'<θ. As shown in FIG. 7, the point of the mirror 40 at which the laser beam is actually reflected, i.e. the point of the mirror 40 which intersects the optical axis 01 is displaced within a zone t along the optical axis 01. Therefore, the laser beam reflected from the mirror 40 crosses the optical axis 02. As a result, the arrangement which satisfies δ2>δ1 can be determined by setting the distance between the optical axis 01 and the recording surface of the optical disk D to an optimal value.

FIG. 7 is an enlarged sectional view, useful in explaining the relationship between the rotation of the mirror 40 of FIG. 5A and the course of the laser beam guided to the mirror 40 along the optical axis 01. In FIG. 7, the angle formed between the optical axes 01 and 02 is set greater than 90° so as to clearly indicate directions in which the laser beam is reflected from the mirror 40 in accordance with its rotation.

As explained above, even when the flat-surface mirror 40 of the galvano mirror 34 inclines, the center of the laser beam guided to the objective lens 36 is prevented from being greatly deviated from the optical axis 02 of the lens 36.

Figure 8:
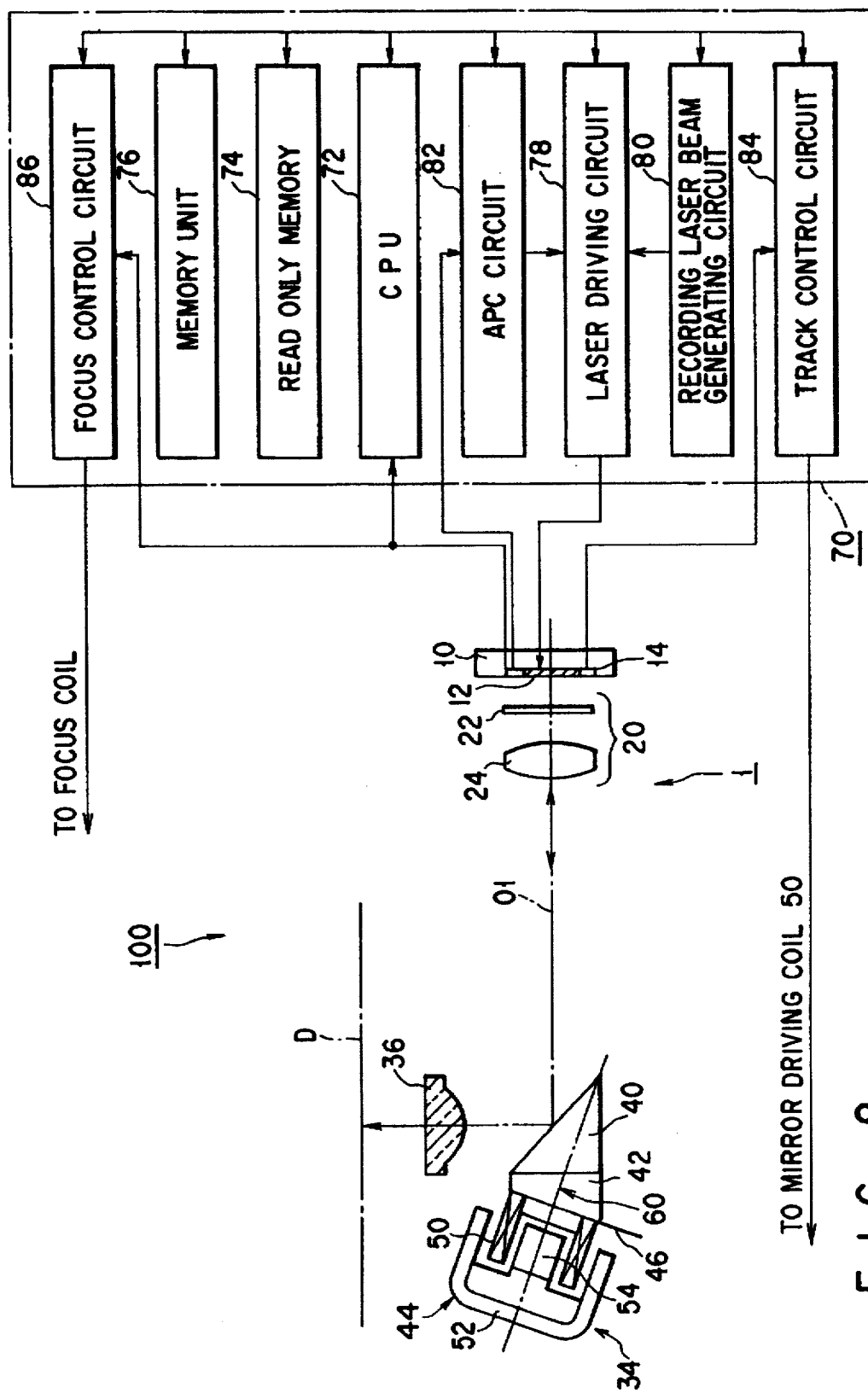
FIG. 8 is a schematic block diagram, showing an example of a data processing apparatus which uses the optical head unit shown in FIGS. 1–3.

FIG. 8 is a schematic block diagram, showing an example of a data recording/reproducing apparatus which employs the optical head unit shown in FIGS. 1-3.

As is shown in FIG. 8, a data recording/reproducing apparatus 100 has the optical head unit shown in FIGS. 1-3 and a signal processing unit 70.

The signal processing unit 70 is connected to a CPU 72 as a main controller, and comprises a ROM (Read Only Memory) 74 which stores initial data, protocols, etc. for operating the CPU 72, and a memory unit 76 connected to the CPU 72 and including a plurality of memories for temporarily storing to-be-recorded data input from the outside, data read from the recording surface (not shown) of the optical disk D, and data input from a host computer (not shown), etc.

The CPU 72 sets the magnitude of the current generated from a laser driving circuit 78 for driving the laser element 12, so as to cause the light emitted from the element 12 to have a predetermined intensity. Further, the CPU 72 instructs a recording laser beam generation circuit (laser modulation circuit) 80 to modulate, in accordance with to-be-recorded data stored in the memory unit 76, the intensity of the laser beam emitted from the laser element 12 and controlled to have the predetermined intensity by the laser driving circuit 78. The CPU 72 also instructs the laser driving circuit 78 to make constant the light intensity of the laser beam from the laser element 12, on the basis of the output of an APC (Auto Power Control) circuit 82. The APC circuit is connected to a monitor detector (not shown) for determining the amount of control to keep constant the light intensity of the laser beam emitted from the laser element 12, on the basis of the intensity of a monitor laser beam reflected from a monitor detection flat-surface mirror, not shown (which can be provided, for example, by forming, of a half mirror, that side of the diffraction grating 22 of the stationary optical system 20 which is opposed to the laser element 12, and inclining the diffraction grating 22 by a predetermined angle with respect to the optical axis 01).

The CPU 72 is connected to a track control circuit 84 which is connected to a predetermined detection area of the photo detector 14 via an amplifier (not shown). The circuit 84 sets the driving amount of the mirror driving unit 44 of the galvano mirror unit 34, i.e. the rotational angle of the flat-surface mirror 40, on the basis of a track error amount detected by tracking (which will be explained later) based on a laser beam reflected from the optical disk D. The CPU 72 is also connected to a focus control circuit 86 which is connected to a predetermined detection area of the photo detector 14 via an amplifier (not shown). The circuit 86 sets the magnitude of a driving current to be supplied to a focus coil (not shown) for controlling the position of the objective lens 36, i.e. a lens holder (not shown), on the basis of a focus error amount detected by focusing (which will be explained later) based on the laser beam reflected from the optical disk D.

The operation of the data processing unit shown in FIG. 8 will be explained.

When the power switch (not shown) of the optical disk unit (data recording/reproducing unit) 100 is turned on, the initial program is read from the ROM 74 under the control of the CPU 72, thereby initializing the optical disk unit 100.

Thereafter, a linear motor (not shown) is activated to move the movable optical system 30, i.e. the objective lens 36, toward the radial center (not shown) of the optical disk.

Subsequently, the CPU 72 instructs, on the basis of initial control data stored in the ROM 74, the laser driving circuit 78 to cause the laser element 12 to perform preliminary emission for focus locking. As a result, the laser driving circuit 78 supplies the laser element 12 with a laser driving current corresponding to a reproduction beam. In the preliminary emission, the intensity of the laser beam emitted from the laser element 12 is set to a value identical to that of the reproduction laser beam.

The reproduction beam from the laser element 12 passes the diffraction grating 22 of the stationary optical system 20, then is collimated by the collimate lens 24, and passes a ¼ plate (not shown). The laser beam has its polarization surface circularly polarized by the ¼ plate. The laser beam is then guided to the flat-surface mirror 40 of the galvano mirror unit 34.

The laser beam is diverted to the objective lens 36 by the flat-surface mirror 40, and radiated onto a predetermined track of the optical disk.

The laser beam has its intensity modulated by data stored in the track (i.e. pits formed therein). Then, the laser beam again passes the objective lens 36, the flat-surface mirror 40, the ¼ plate, and the collimate lens 24 in this order, and returns to the diffraction grating 22.

In the diffraction grating 22, the laser beam is divided, by a hologram diffraction pattern (not shown) formed in the grating 22, to form a light pattern on the correspondingly patterned detection area of the photo detector 14 of the light emitting/receiving element 10.

The laser beam reflected from the optical disk and forming an image on the patterned detection area of the photo detector 14 is converted, by photo-electric conversion, to currents corresponding to light intensities detected by the respective area components of the patterned area of the detector 14. These currents are stabilized by an amplifier (not shown), and then added by an adder (not shown) where a predetermined addition is performed, thereby obtaining a track subtraction signal Tsub and a focus error amount Ferr.

On the basis of the track subtraction signal Tsub, and under the control of the CPU 72, a track compensation amount for compensating the track error of the objective lens 36, i.e. the amount of rotation of the flat-surface mirror 40 of the galvano mirror unit 34, is read from the memory unit 76, and also the level of a mirror driving signal is read therefrom, which indicates the magnitude of a driving current to be supplied to the mirror driving coil 50 of the mirror driving unit 44 of the galvano mirror unit 34 for rotating the mirror 40.

The mirror driving signal read from the memory unit 76 is input to the track control circuit 84. As a result, a driving current of a magnitude corresponding to the signal is supplied from the track control circuit 84 to the mirror driving coil 50, which in turn generates a thrust in a predetermined direction to thereby move (rotate) the mirror support member 42 and the mirror 40 in a predetermined direction. Thus, the laser beam passing the optical axis 02 of the objective lens 36 is aligned with a track (groove) in the recording surface of the optical disk.

In other words, when the CPU 72 has supplied the track control circuit 84 with an instruction for rotating the flat-surface mirror 40 of the galvano mirror unit 34 through a predetermined angle, the circuit 84 outputs a current to the mirror driving coil 50, thereby driving the mirror driving unit 44 and slightly rotating the mirror 40 in a predetermined direction about the rotation center 60. As a result, the center of laser beam passing the objective lens 36 is aligned with the center of a track of the recording surface of the optical disk (accurate tracking is performed).

Moreover, on the basis of the focus error amount Ferr and under the control of the CPU 72, those control data items are read from the memory unit 76, which indicate the focus compensation amount for compensating the focus error of the objective lens 36, i.e. the amount of movement of the lens 36 in a direction perpendicular to the recording surface of the optical disk, and also the level of a focus coil driving signal corresponding to the magnitude of a coil driving current to be supplied to the focus coil for moving the lens 36 by the focus compensation amount.

The focus coil driving signal read from the memory unit 76 is input to the focus control circuit 86, which in turn supplies the focus coil with a driving current of a magnitude corresponding to the focus coil driving signal. As a result, the distance between the position in which the laser beam passing the optical axis 01 of the objective lens 36 has a minimal beam waist, and the objective lens 36 is set equal to the distance between the recording surface of the optical disk and the objective lens 36 (focusing is made).

The current output from the photo detector 14 (i.e. obtained by combining the outputs of predetermined detection areas of the detector 14) is compared with a reference current beforehand supplied to the CPU 72, and taken out as data stored in the optical disk, i.e. a data reproduction signal.

Figure 9:
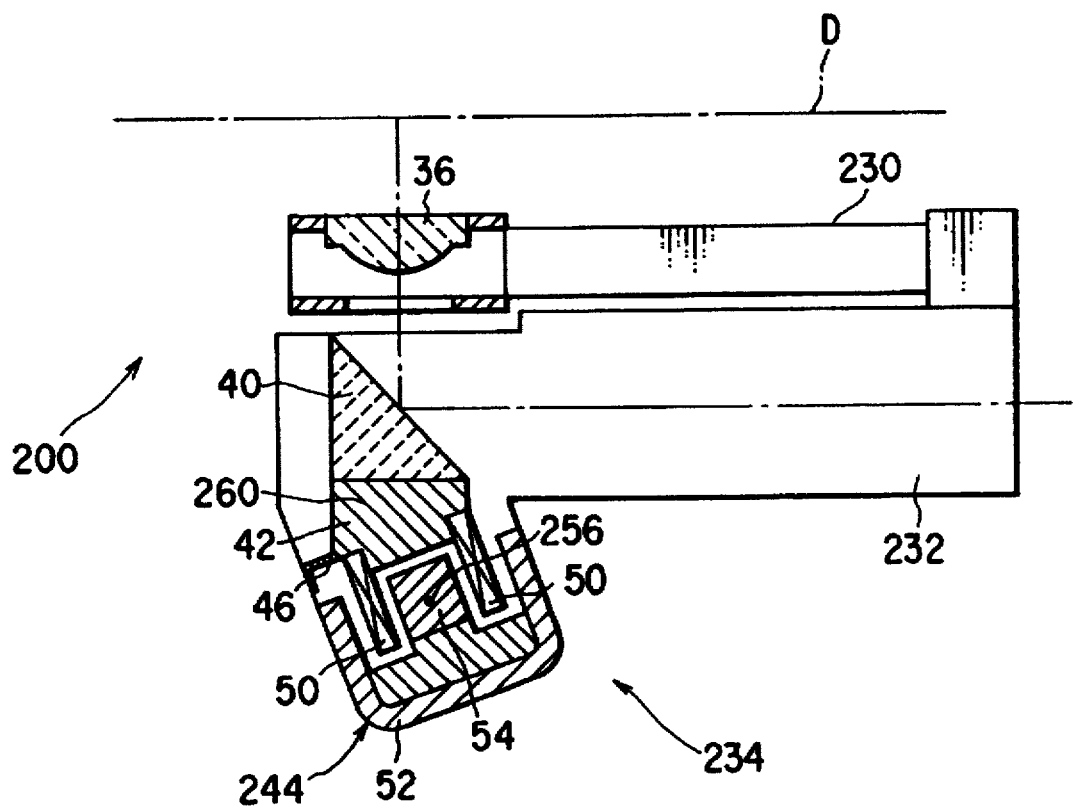
FIG. 9 is a fragmentary sectional view, showing another example of the optical head unit shown in FIGS. 1–3.

FIG. 9 is a fragmentary sectional view, showing another example of the optical head unit shown in FIGS. 1–3.

As is shown in FIG. 9, a galvano mirror unit 234 has the flat-surface mirror 40, the mirror support member 42 and a mirror driving unit 244. The flat-surface mirror 40 diverts a laser beam from the light emitting/receiving unit 10, to the recording surface of the optical disk D, and diverts the laser beam reflected from the recording surface, to the stationary optical system 20. The flat-surface mirror 40 is a face mirror or a prism mirror, which has a triangular cross section or a quadrilateral cross section with non-parallel sides as viewed in a direction perpendicular to a plane defined by the optical axis 01 between the mirror itself and the light emitting/receiving unit 10, and the normal line of the reflection surface of the flat-surface mirror 40. At least one of the two sides (surfaces) of the flat-surface mirror 40 which are perpendicular to each other is fixed to a predetermined portion of the mirror support member 42 by means of an adhesive or a fixing mechanism. The mirror support member 42 supports the flat-surface mirror 40 such that the mirror can move in a predetermined direction. The mirror support member 42 is formed integral with a bobbin portion (which contains a driving coil, explained later, for the mirror driving unit) at a side opposite to the side at which the flat-surface mirror 40 is secured.

The mirror driving unit 244 applies a driving force to the mirror support member 42 for moving the member 42 and hence the flat-surface mirror 40 by a predetermined amount. The mirror driving unit 244 has a mirror driving coil 50 formed in the bobbin portion of the mirror support member 42. A yoke 52, which is used as a case containing the mirror driving unit 244 and also as a part of a magnetic circuit for the coil 50, surrounds the mirror driving coil 50. In a region defined by the yoke 52 and the coil 50, a stationary magnet 54 is located which provides the coil 50 with a magnetic field of a predetermined direction and cooperates with the yoke 52 to constitute the magnetic circuit. The center 256 of gravity of the mirror driving unit 244 itself is situated in the stationary magnet 54.

A detailed explanation will be given of the galvano mirror unit 234.

Figure 10A:
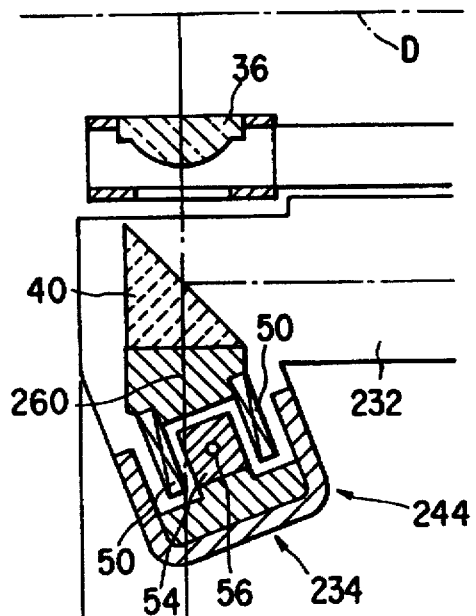
FIG. 10A is a schematic sectional view, showing a mirror driving unit incorporated in the optical head unit of FIG. 9.
Figure 11A:
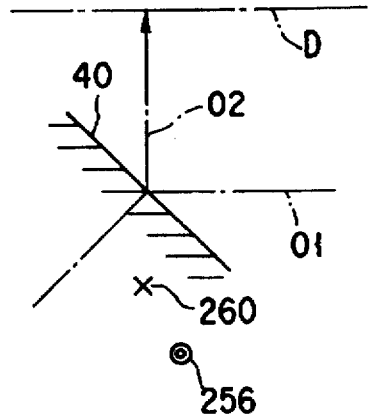
FIG. 11A is a schematic view, showing the center of rotation and the center of driving of the mirror driving unit of FIG. 10A.

As is shown in FIGS. 10A and 11A, the center 260 of gravity of a movable section, having the flat-surface mirror 40, the mirror support member 42 and the mirror driving coil 50 which are assembled integral with each other, is situated on an extended line of the optical axis 02 extended from that point of the reflecting surface of the mirror 40 which intersects the optical axis 01. Further, the center 260 of gravity of the movable section is made identical to the center of gravity of the mirror support member 42 by optimizing the size, the configuration and/or the material of the mirror support member 42 and the size and/or the weight of the coil 50. As is shown in FIG. 10A, the center 260 of gravity of the movable section is made identical to the center of rotation of the mirror 40, too. Moreover, the center 260 of gravity is distorted relative to a line perpendicular to that point of the reflecting surface of the mirror 40 which intersects the optical axis 01. On the other hand, the driving center of the mirror driving unit 244, i.e. the center 56 of gravity of the stationary magnet 54, is situated in a region defined by an extension from the optical axis 01 and an extension from the optical axis 02, and closer to the light source than a line perpendicular to the reflecting surface of the mirror 40. In other words, the center 56 of gravity of the mirror driving unit 244 is located in a position in which only the magnetic moment will exert a force (i.e. no distortion will occur).

Figure 10B:
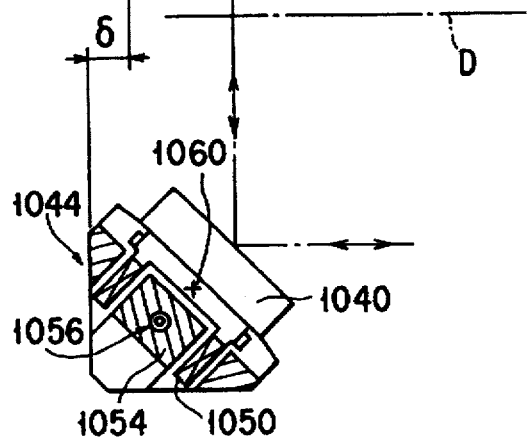
FIG. 10B is a schematic sectional view, showing a conventional mirror driving unit to be compared with the mirror driving unit of FIG. 10A.
Figure 11B:
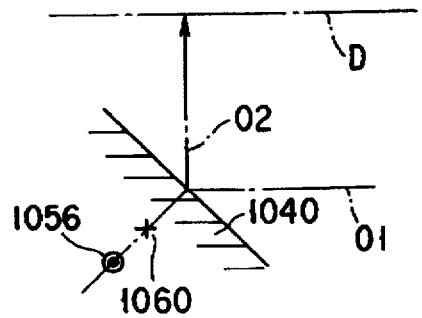
FIG. 11B is a schematic view, showing the center of rotation and the center of driving of the conventional mirror driving unit of FIG. 10B.

10 FIGS. 10B and 11B show a conventional mirror unit as a comparative example, and are similar to FIGS. 4B and 5B.

As is evident from FIGS. 10A, 11A, 10B and 11B, the amount of projection (i.e. the thickness) of the mirror driving unit 244 toward the outside of the optical head unit in the direction parallel to the surface of the optical disk D is smaller by δ than that of the conventional driving unit 1040. Further, although the thickness of the mirror driving unit 244 in a direction perpendicular to the surface of the optical disk D is greater than that of the mirror driving unit 44 shown in FIGS. 1–3, the unit 244 can reduce the overall volume of the optical head unit.

As explained above, in the optical head unit of the invention, even when the reflection means inclines, the laser beam reflected by the reflection means and guided to the recording medium is prevented from being greatly deviated from the optical axis between the reflection means and the recording medium. Accordingly, light reflected by the reflection means is prevented from being converged on that portion of the recording medium which is significantly displaced from a target portion of the same, thereby realizing accurate tracking.

In addition, in an embodiment of the invention, the thickness of the optical head unit is reduced. In another embodiment of the invention, the volume of the optical head unit is reduced.

By virtue of the above-described features of the invention, the objective lens can be located in the vicinity of the center of the optical disk so as to increase the recording capacity of the optical disk. On the other hand, where the recording capacity is set to the same value as in the conventional case, a motor of a greater torque can be employed so as to rotate the optical disk at a higher speed than in the conventional case, thereby increasing the sampling rate.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An optical head unit for use in a data read/write apparatus comprising:

means for reflecting light emitted from a light source, to a recording medium;

means for supporting the reflecting means such that said reflecting means has a center of rotation located on a point on an extended portion of an optical axis between said reflecting means and the light source, the extended portion being defined by extending the optical axis through the reflecting means such that the optical axis and the extended portion are on a single line; and means for rotating said supporting means about the center of rotation.

2. The optical head unit according to claim 1, wherein said rotating means has a center of gravity located closer to the recording medium than the optical axis.

3. The optical head unit according to claim 2, wherein the center of gravity of said rotating means is located more remote from the light source than a point of a reflection surface of said reflecting means which intersects the optical axis.

4. The optical head unit according to claim 1, wherein said reflecting means has one of a quadrilateral cross section including non-parallel sides and a triangular cross section, as viewed in a direction perpendicular to a plane defined by a normal line of a reflection surface of said reflecting means and the optical axis.

5. The optical head unit according to claim 1, wherein said reflecting means has a rectangular cross section as viewed in a direction perpendicular to a plane defined by a normal line of the reflection surface of said reflecting means and the optical axis.

6. The optical head unit according to claim 1, wherein a center of gravity of said rotating means is located more remote from the light source than a point of a reflection surface of said reflecting means which intersects the optical axis.

7. An optical head unit for use in a data read/write apparatus comprising:

means for reflecting light emitted from a light source, to a recording medium;

means for supporting said reflecting means such that said reflecting means has a center of rotation located on a point on an extended portion of an optical axis perpendicular to a recording surface of the recording medium between the reflecting means and the recording medium, the extended portion being defined by extending the optical axis through the reflecting means such that the optical axis and the extended portion are on a single line; and means for rotating said supporting means about the center of rotation.

8. The optical head unit according to claim 7, wherein a center of gravity of said rotating means is located more remote from the recording medium than a point of a reflection surface of said reflecting means which intersects the optical axis.

9. The optical head unit according to claim 7, wherein said reflecting means has one of a triangular cross section and a quadrilateral cross section including non-parallel sides, as viewed in a direction perpendicular to a plane defined by a normal line of a reflection surface of said reflecting means and the optical axis.

10. The optical head unit according to claim 7, wherein said reflecting means has a rectangular cross section as viewed in a direction perpendicular to a plane defined by a normal line of a reflection surface of said reflecting means and the optical axis.

11. An optical head unit for use in a data read/write apparatus comprising:

a light source for generating a light beam;

means for reflecting the light beam emitted from the light source, to a recording medium;

means for supporting said reflecting means such that said reflecting means can rotate about a center of rotation, said center of rotation being on one of an extended portion of a first optical axis and an extended portion of a second optical axis, said first optical axis extending from said light source to said reflecting means and said second optical axis extending from said reflecting means to said recording medium, said extended portion of said first optical axis extends through said reflecting means such that said extended portion of said first optical axis and the first optical axis are on a first single line, said extended portion of said second optical axis extends through said reflecting means such that said extended portion of said second optical axis and said second optical axis are on a second single line; and means for rotating said supporting means about said center of rotation.

12. A data read/write apparatus comprising:

a laser element for emitting a light beam;

means for reflecting the light beam emitted from the laser element, to a recording medium;

means for supporting said reflecting means such that said reflecting means can rotate about a a center of rotation, said center of rotation being on one of an extended portion of a first optical axis and an extended portion of a second optical axis, said first optical axis extending from said laser element to said reflecting means and said second optical axis extending from said reflecting means to said recording medium, said extended portion of said first optical axis extends through said reflecting means such that said extended portion of said first optical axis and the first optical axis are on a first single line, said extended portion of said second optical axis extends through said reflecting means such that said extended portion of said second optical axis and said second axis are on a second single line;

means for rotating said supporting means about said center of rotation;

means for separating, by diffraction, a light beam reflected from the recording medium, from the light beam directed from the laser element to the recording medium;

means for converting the light beam reflected from the recording medium and separated by said separating means, to an electric signal corresponding to an intensity of the light beam;

means for controlling an amount of rotating of said rotating means based on an output from said converting means; and means for reproducing data stored in the recording medium based on said output from said converting means.

13. The optical head unit according to claim 12, wherein said reflecting means has a rectangular cross section as viewed in a direction perpendicular to a plane defined by a normal line of a reflection surface of said reflecting means and the first optical axis.

14. The optical head unit according to claim 12, wherein said reflecting means has one of a quadrilateral cross section and a triangular cross section, as viewed in a direction perpendicular to a plane defined by a normal line of a reflection surface of said reflecting means and the first optical axis.

15. The optical head unit according to claim 14, wherein said rotating means has a center of gravity located closer to the laser element that the second optical axis.

16. The optical head unit according to claim 15, wherein the center of gravity said rotating means is located closer to the light source than a point of a reflection surface of said reflecting means which intersects the first optical axis and the second optical axis.

17. The optical head unit according to claim 14, wherein said rotating means has a center of gravity located closer to the recording medium than the first optical axis.

18. The optical head unit according to claim 17, wherein the center of gravity of said rotating means is located more remote from the laser element than a point of a reflection surface of said reflecting means which intersects the first optical axis and the second optical axis.

19. An optical head for use in a data read/write apparatus comprising:

a laser element for emitting a light beam;

means for reflecting the light beam emitted from the laser element, to a recording medium;

means for supporting said reflecting means such that said reflecting means can rotate about a predetermined point, the predetermined point being on one of an extended portion of a first optical axis and an extended portion of a second optical axis, the first optical axis extending from the laser element to the reflecting means and the second optical axis extending from the reflecting means to the recording medium, the extended portion of the first optical axis extends through the reflecting means such that the extended portion of the first optical axis and the first optical axis are on a first single line, the extended portion of the second optical axis extends through the reflecting means such that the extended portion of the second optical axis and the second optical axis are on a second single line, the predetermined point being located closer to the recording medium than a reflection point of a reflection surface of said reflecting means, which intersects the first optical axis and the second optical axis, and the predetermined point being located more remote from the laser element than the reflection point, or the predetermined point being located closer to the laser element than the reflection point and more remote from the recording medium than the reflection point; and means for rotating said supporting means about the predetermined point.

* * * * *